United States Patent [19]

Stephan

[11] 4,086,033
[45] Apr. 25, 1978

[54] OIL PUMP FOR MOTOR COMPRESSOR
[75] Inventor: Alfred Stephan, Columbus, Ohio
[73] Assignee: White-Westinghouse Corporation, Pittsburgh, Pa.
[21] Appl. No.: 686,889
[22] Filed: May 17, 1976
[51] Int. Cl.² .............. F04B 17/00; F04B 35/04; F04B 39/14
[52] U.S. Cl. .................. 417/368; 417/902; 415/88; 310/61; 310/67 R
[58] Field of Search .......... 417/368, 415, 902, 424 R; 310/42, 90, 61, 67 R, 270; 415/88; 29/598

[56] References Cited
U.S. PATENT DOCUMENTS

| 920,846 | 5/1909 | Erben | 310/270 |
|---|---|---|---|
| 1,405,959 | 2/1922 | Woock et al. | 310/67 R |
| 2,990,111 | 6/1961 | Bohn | 417/902 |
| 3,544,240 | 12/1970 | Rundell | 417/415 |
| 3,664,461 | 5/1972 | Leffers et al. | 415/88 |

Primary Examiner—Carlton R. Croyle
Assistant Examiner—Thomas I. Ross
Attorney, Agent, or Firm—McNenny, Pearne, Gordon, Gail, Dickinson & Schiller

[57] ABSTRACT

In a hermetically-sealed motor compressor having a vertically oriented crankshaft into which oil is centrifugally pumped from a sump, the oil pumping tube extending into the sump is cast as an integral part of the lower end ring of the rotor, providing a unitary rotor end ring and oil tube.

6 Claims, 3 Drawing Figures

OIL PUMP FOR MOTOR COMPRESSOR

BACKGROUND OF THE INVENTION

Hermetically-sealed motor compressors having vertically oriented crankshafts are well known in the art and commonly used as refrigerant compressors in refrigerator/freezers and air conditioners. In such compressors it is common to lubricate the bearing areas and cool the motor from a reservoir of oil in the bottom of the casing. The oil is elevated through a tube having a generally hollow, conical end portion extending into the oil and attached to the crankshaft, which, through rotation, centrifugally forces the oil upwardly through the tube and also through openings in the crankshaft to be ultimately expelled at predetermined areas to lubricate the bearings and cool the compressor assembly. Heretofore, it was common to merely attach a formed metal tube to the lower end of the cast crankshaft as is shown in U.S. Pat. Nos. 3,285,504 and 3,410,478. However, this requires both the fabrication of the tube, (e.g. metal forming or deep drawing operation) and assembly of the tube to the shaft which requires extra manual handling of the respective parts. In the highly competitive environment of appliances with the relatively high sales volume, it is apparent that any reduction in parts and assembly labor has substantial financial reward and is therefore greatly desired.

SUMMARY OF THE PRESENT INVENTION

The present invention provides an oil pick-up tube integrally cast with the end ring of the rotor to eliminate the previously separately fabricated and assembled pick-up tube of the prior art. Thus, the crankshaft and the rotor are assembled together with a heat shrink fit as is normally done, however, the terminal end of the shaft is placed in generally sealed fluid flow communication with the surface of the end ring surrounding the opening of the tube to provide, in the assembled motor compressor, a continuous oil path through the tube then into and out of the motor shaft as is known. If agitation of the oil is desired, oil stirring blades may be integrally cast on the exterior of the oil pickup tube portion of the rotor.

DESCRIPTION OF THE PREFERRED EMBODIMENT

It is necessary in centrifugal oil pumping tubes for the centrifugal force provided by the spinning tube to be directed upwardly to lift the oil. This is generally accomplished by the oil pick-up tube having upwardly and outwardly diverging side walls (as shown in the two previously identified patents) and a smaller inlet opening than the diameter of the adjacent walls of the tube as shown in U.S. Pat. No. 3,317,123, or, being mounted off-center with the inlet end curved or slanted towards the axis of rotation as shown in U.S. Pat. No. 3,306,524. Thus, in all cases, it is seen that the inlet end of the oil tube has a contour that provides lifting force to the oil as it is centrifugally forced outwardly from the center.

Figure 1:
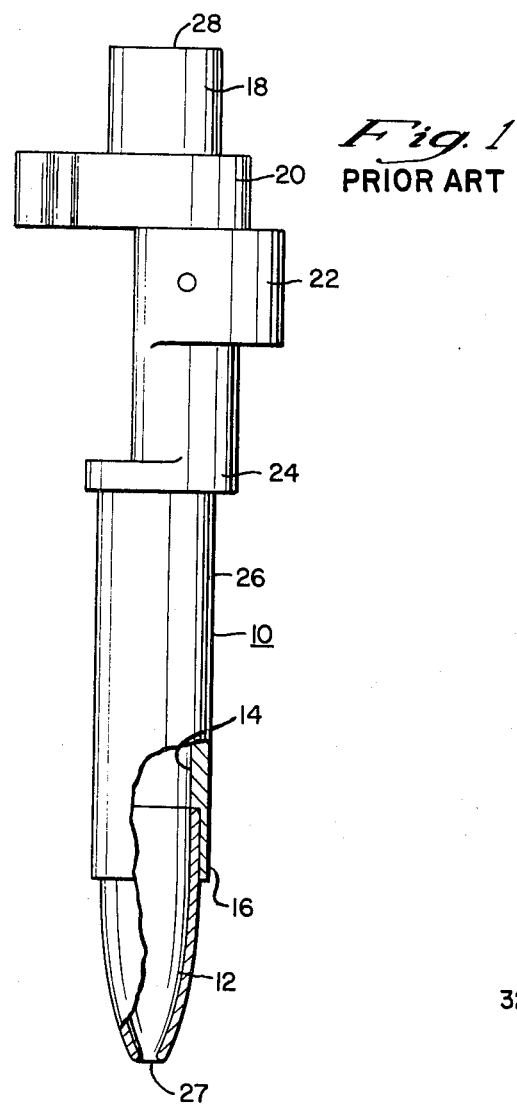
FIG. 1 is a view of the prior art motor shaft and oil pick-up tube assembly.

Referring to FIG. 1, a typical prior art compressor crankshaft assembly 10 is shown. (The complete compressor is generally as is shown in U.S. Pat. No. 3,410,478 which is herein incorporated by reference for its disclosure of the compressor structure.) The shaft 10 has an oil tube 12, made separately as by forming from a steel tube and press fitting it into an appropriate bore 14 in the lower end 16 of the shaft. As therein seen, the shaft includes from the top down, a top stub shaft 18 that in many cases is received in a bearing, a counterbalance 20, an eccentric portion 22, an eccentric plate 24 formed at one end of a straight section 26 of the main body of the shaft and the oil tube. Section 26 provides another bearing surface generally subadjacent the eccentric plate 24 and also provides the portion of the shaft on which the rotor of the motor is mounted for driving the shaft.

From this description of the typical crankshaft, it is seen that it would be relatively difficult to cast such a shaft with the necessary contoured or shaped end to provide an oil pick-up. As such crankshaft is generally made of cast iron, providing a casting core for such a relatively long, narrow passageway is beyond the capability of high production casting. Further, should it be made of a material that can be die cast, the bore forming die portion would be required to be removed axially from either end. Thus, assuming such a die is withdrawn from the oil pick-up end 27, it would generally require the opening therein to be large enough to pass the remaining die and thereby produce an opening having in the least, a diameter generally equal to the inner diameter of the tube and thus not having a lifting effect.

Further, to withdraw a die from opposite end 28 would require sufficient passage space that the crank pin 22 would in all probability either interfere with the removal or itself require modification to permit such withdrawal with the likely result being an unsatisfactory compromise.

Therefore, to accommodate the requirement of an oil lifting bore in the crankshaft, such a bore was generally machined thereinto so the bore had straight side walls, and a separate pre-formed oil-lifting tube was press fitted into the bore to complete the assembly with the lifting force provided by the tube sufficient to force the oil up through the shaft.

Figure 2:
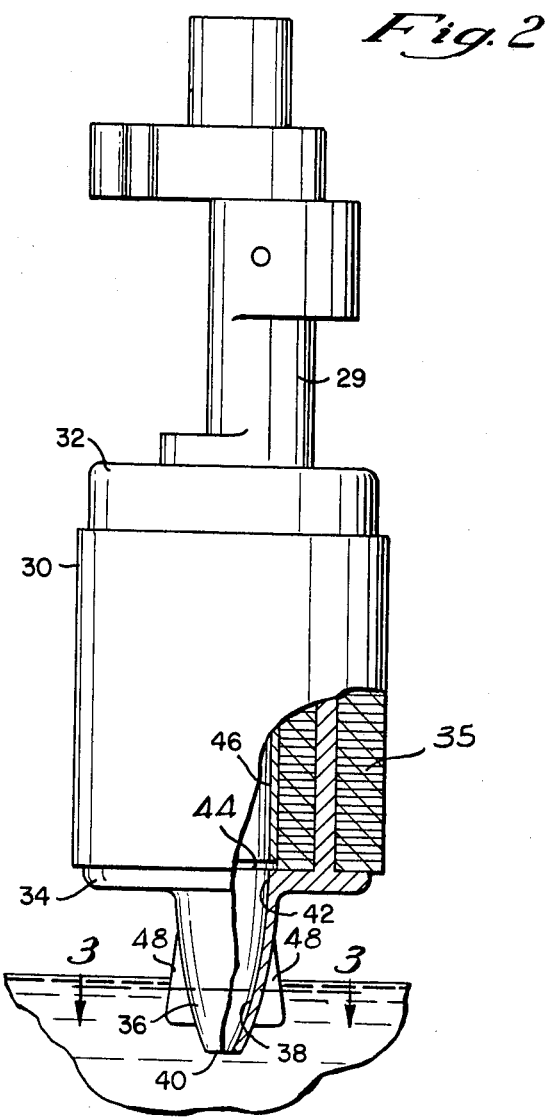
FIG. 2 is an elevational view of a crankshaft and rotor assembly with the rotor end ring including an oil pick-up tube according to the present invention and with portions broken away to show the interior thereof.
Figure 3:
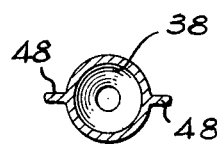
FIG. 3 is a cross-sectional view taken on line 3—3 of FIG. 2.

Referring now to FIG. 2, the present invention is shown and provides a crankshaft 29 similar to the prior art crankshaft in its general configuration. This crankshaft is securely mounted to the rotor 30 of the motor with a heat shrink fit therebetween as is well known in the art. The rotor 30 includes a pair of integrally formed, as by die casting, opposing end rings 32, 34, sandwiching therebetween the rotor laminations 35. The upper end ring 32 has the same annular configuration well known in the art including a central opening concentric with the central openings through the laminations, all of the openings properly sized so as to receive the crankshaft 29 for a heat shrink fit therebetween. The lower end ring 34 includes an integrally cast oil pick-up tube 36, depending from the lower face of the ring and having an axial bore 38 that extends from the inlet end 40 of the tube 36 through the ring 34 to the opposite face 44. The bore is sized slightly less than the central opening through the laminations to provide a seating surface or definite stop for the motor shaft when inserted thereinto during the heat shrinking assembly.

As is seen, the oil tube 36 is contoured at its inlet end 40 to provide a relatively bullet-nose configuration with the bore 38 gradually enlarging from an inlet opening to a straight side wall configuration defining an opening 42 generally concentric with an opening 46 in the motor shaft.

Further, although the surface 44 of the lower end ring immediately adjacent the opening 36 provides a seating surface for the lower end of the shaft, it is not necessary for oil flow communication between the tube and the shaft that these two surfaces are in abutting contact. For this reason a slight gap is shown in FIG. 2 to illustrate the relative position of the shaft and the end ring where the shaft is not completely seated thereon. As the end rings are cast onto the laminations, there is no way for the oil entering this gap to escape and therefore, the oil path up the shaft remains unaltered. It is also evident that the exterior of the oil tube can be readily designed to include oil stirring blades 48 for continuous agitation of the oil in the sump for preventing temperature gradients from forming therein.

Thus, casting the oil pick-up tube as an integral portion of the lower end ring of the rotor reduces the number of separate parts in the total assembly and reduces the manual labor otherwise necessary to separately attach the oil tube, with the added benefit that such an integral structure does not permit a faulty assembly that could otherwise cause the previous two parts to become separated in use and thereby causing a compressor breakdown.

I claim:

1. A motor compressor having a housing enclosing a stationary stator and a rotor connected to a vertically-oriented motor shaft having an oil passage therethrough; centrifugal pump means for pumping oil to said oil passage in said shaft; said rotor having integrally formed opposed end rings sandwiching the rotor laminations therebetween; and wherein the lowermost end ring includes said centrifugal pump means integrally formed therewith, said pump means depending from and supported by said lower most end ring substantially coaxially with said motor shaft and defining a tube having an oil passageway leading from the distal end of said tube disposed in an oil reservoir to said oil passage of said shaft.

2. Structure according to claim 1 wherein said rotor laminations define an axial bore for a heat shrink fit receipt of said motor shaft, and said oil passageway in said tube defines a lesser diameter than said bore whereby said upper face of said lower end ring defines an opposed seating surface for said shaft about the perimeter of said oil passageway.

3. Structure according to claim 2 wherein the exterior surface of said integrally formed pump means defines oil agitating structure to stir the oil as the rotor rotates.

4. Structure according to claim 3 wherein the oil passageway comprises a bullet-nose configuration having a smaller inlet opening with arcuate upwardly outwardly increasing side walls to lift the oil upwardly therealong.

5. A motor compressor having a generally vertically oriented crankshaft coupled to a rotor and defining an internal passage permitting oil to flow therethrough and an oil pumping means having an inlet end disposed below the oil level within the housing of said motor compressor and an outlet end in confined flow communication with the passage of said shaft, wherein the improvement comprises;
an integrally cast lower rotor end ring and centrifugal oil pump supported by said ring, said integral ring and pump assembled to said motor in facing relationship with the lower end of said shaft and wherein said passage in said shaft is disposed generally concentric with said centrifugal oil pump.

6. Structure according to claim 5 wherein the exterior surface of said integrally cast lower end ring and oil pump includes oil agitating structure to stir the oil as the rotor rotates.

* * * * *